UNITED STATES PATENT OFFICE.

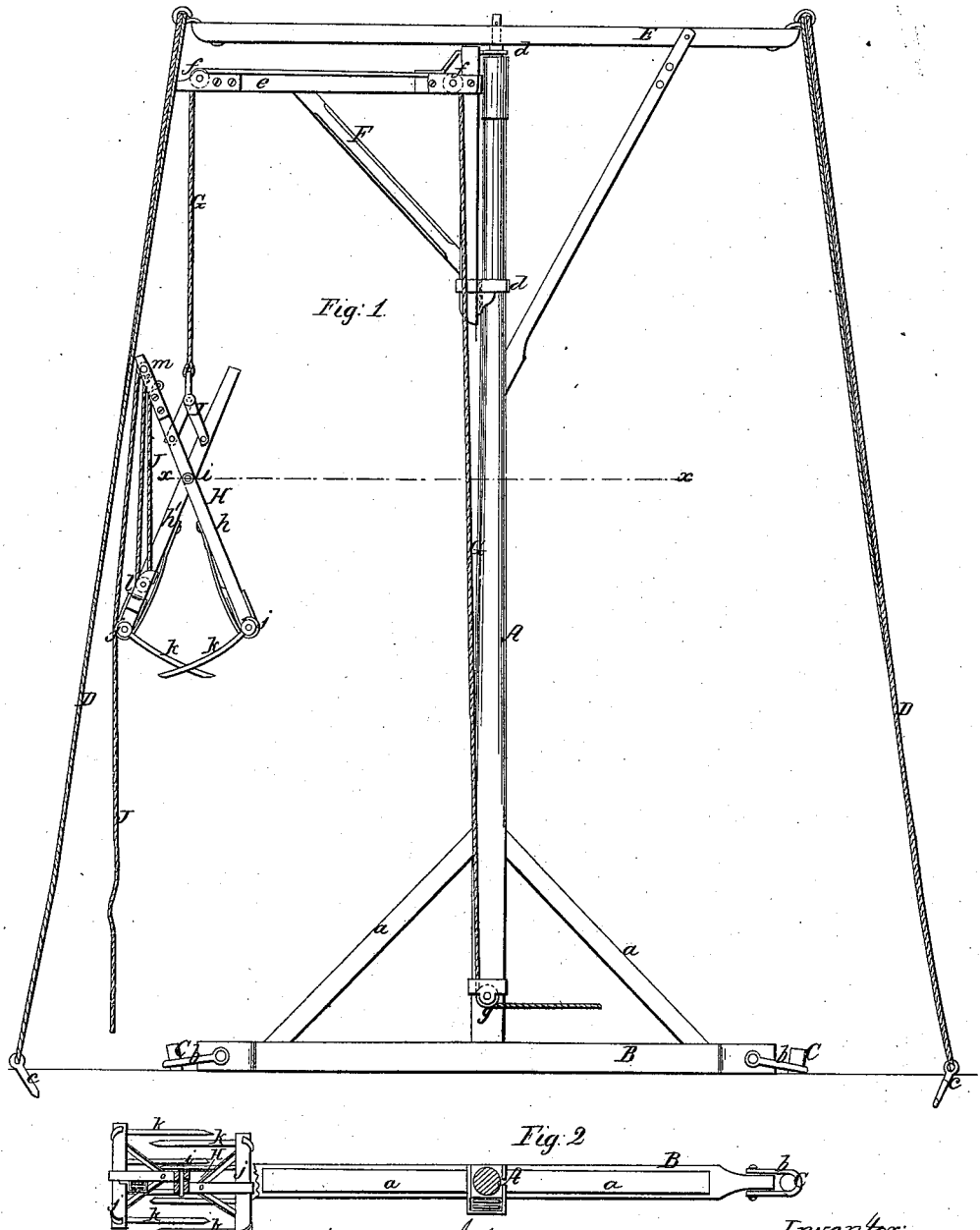

WILLIAM M. MASON, OF POLO, ILLINOIS.

IMPROVEMENT IN MACHINES FOR STACKING HAY.

Specification forming part of Letters Patent No. 34,513, dated February 25, 1862.

*To all whom it may concern:*

Be it known that I, WILLIAM M. MASON, of Polo, in the county of Ogle and State of Illinois, have invented a new and Improved Device for Stacking Grain, Hay, Stalks, &c.; and I do hereby declare that the following is a full, clear, and exact description of the same, reference being had to the annexed drawings, making a part of this specification, in which—

Figure 1 is an elevation of my invention adjusted in proper working order; and Fig. 2, a horizontal section of the same, taken in the line $x\ x$ of Fig. 1.

Similar letters of reference indicate corresponding parts in the two figures.

To enable those skilled in the art to fully understand and construct my invention, I will proceed to describe it.

A represents a vertical pole, which may be of any suitable height or length. The lower end of the pole A is secured in a cross-piece B and braced by oblique rods $a\ a$. The cross-piece B is secured to the ground by stakes C C, which are driven through eyes $b\ b$ at the ends of the cross-piece, and the pole is retained in a proper vertical position by means of guy-ropes D, the upper ends of which are attached to the ends of a cross-bar E at the top of the pole and the lower ends attached to the ground by means of pins or stakes $c$.

To the upper part of the pole A there is secured a crane F, which may be constructed in the usual way and arranged to swing on the pole in consequence of being fitted to the same by means of eyes or straps $d\ d$. In the horizontal arm $e$ of the crane there are placed two pulleys $f\ f$, one at the back and the other at the front end of the arm, as shown clearly in Fig. 1, and to the lower end of the pole A there is attached a pulley $g$.

G is a rope which passes underneath the pulley $g$ and over the pulleys $f\ f$ in the arm $e$ of the crane. The upper end of the rope has a grappling-fork H connected to it and the draft-animal is attached to the lower end.

The fork H is formed of two cross-bars $h\ h'$, connected by a pivot or fulcrum $i$. The lower ends of the bars $h\ h'$ have heads or cross-bars $j$ attached at right angles, and to these heads or cross-bars teeth $k$ are attached, the teeth of one head fitting between those of the other when the device is closed. (See Fig. 2.) The upper parts of the bars $h\ h'$ above the fulcrum $i$ are connected by a toggle I, and to this toggle the upper end of the rope G is secured.

To the bar $h$ of the fork H the end of a rope J is attached. This rope passes downward and around a pulley $l$ on the lower part of the bar $h'$, and thence upward over a pulley $m$ on the upper part of the bar $h$, and then extending downward within reach of the operator.

The operation of the device is as follows: The pole A is secured in a vertical position at the spot where the stack is to be made and the draft-animal attached to the lower end of the rope G. The operator adjusts the grappling-fork H in the grain, hay, or other substance to be stacked and the draft-animal is started, the fork H and its load being elevated thereby. When the fork is over the direct spot, the animal is stopped and the load discharged from the fork by pulling the rope J, which causes the bars $h\ h'$ to be distended and the forks to separate. As the fork is elevated, the toggle I, to which the rope G is attached, has a tendency to keep the teeth $k$ of the two heads $j$ closed, as shown in Fig. 1. The pole A may be moved along from time to time, so that a long rick may be formed when desired.

The device as a whole is extremely simple and efficient, may be readily transported from place to place, and constructed at a reasonable cost.

Having thus described my invention, what I claim as new, and desire to secure by Letters Patent, is—

The combination of the toggles I, pulleys $l\ m$, and rope J with the fork H, constructed as described, in the manner and for the purpose herein shown and set forth.

WILLIAM M. MASON.

Witnesses:
JAMES MOSHER,
I. C. SALZMAN.